United States Patent Office 3,482,523
Patented Dec. 9, 1969

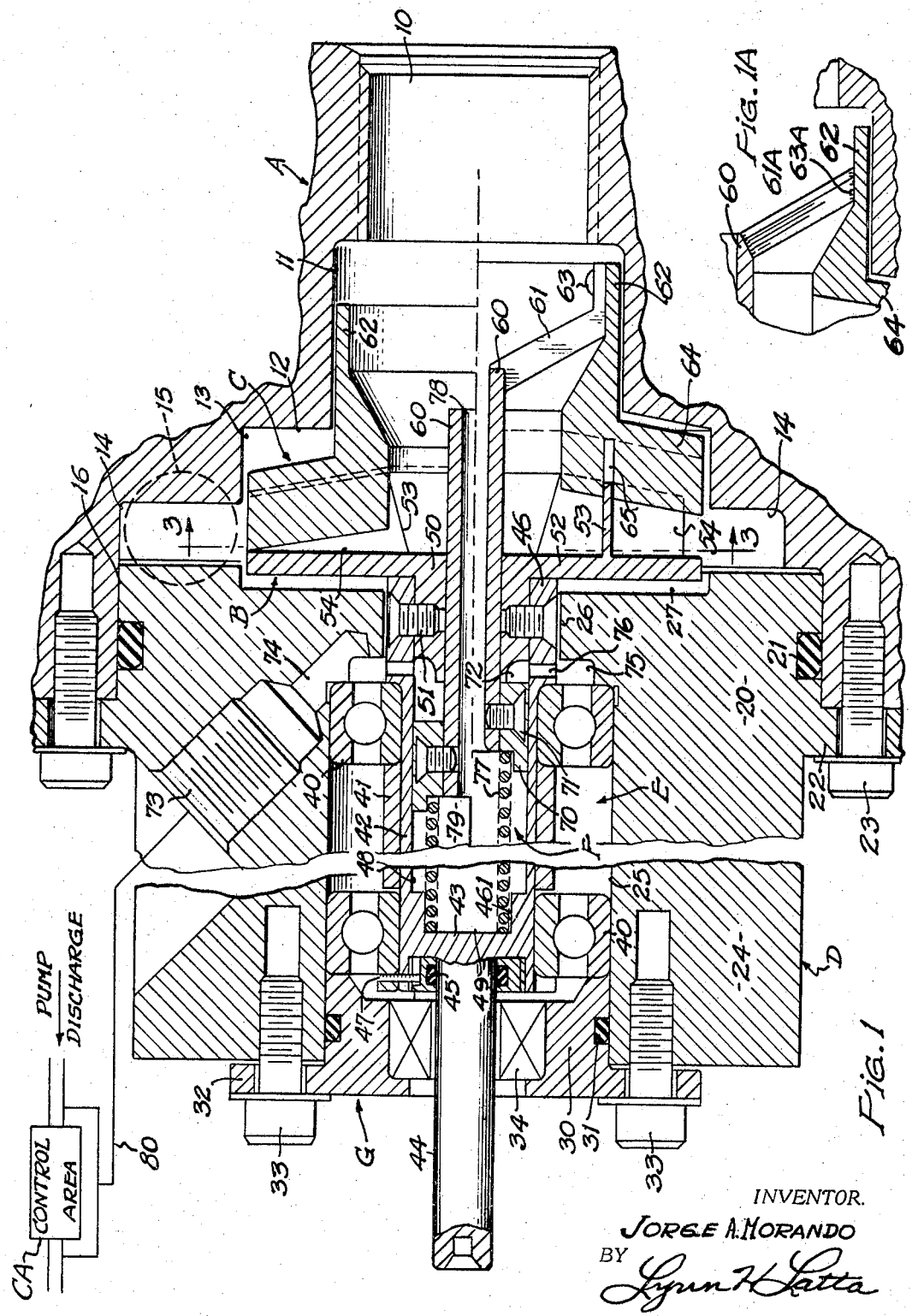

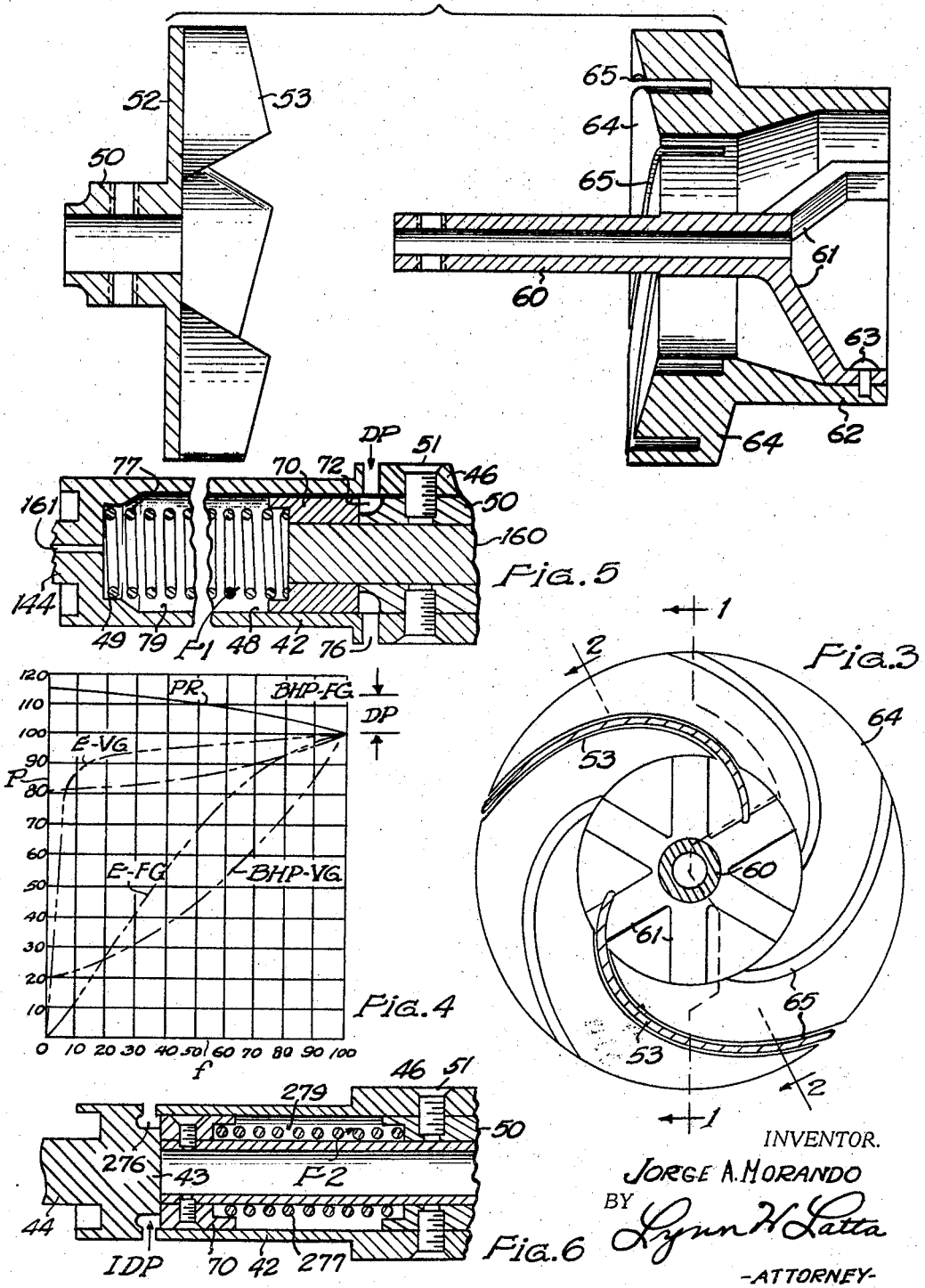

3,482,523
CENTRIFUGAL PUMP WITH FLOW CONTROL BY PRESSURE FEEDBACK
Jorge A. Morando, Burbank, Calif., asignor to Crane Co., doing business as Hydro-Aire Division, Burbank, Calif., a corporation of Illinois
Filed Mar. 6, 1968, Ser. No. 711,129
Int. Cl. F04d 15/00, 17/08
U.S. Cl. 103—97                     3 Claims

ABSTRACT OF THE DISCLOSURE

A centrifugal pump having at its axis an axially-shiftable flow-control actuator responsive to feedback of control pressure, and an impeller with axially shiftable shroud variably positioned by the control actuator so as to vary the pumping area (effective axial width) of the impeller in direct or inverse relation to the feedback pressure, thereby regulating flow and operating efficiency in relation to operating conditions.

BACKGROUND OF INVENTION

The advantages of centrifugal, mechanically driven aircraft fuel pumps and their ability to operate with hot contaminated fuel and the weight savings obtained when compared with positive displacement pumps are well known to all gas-turbine designers. However, the conventional centrifugal pump has a low efficiency at partial load operation at its design speed, resulting in considerable temperature rise.

A vapour core pump, made by Dowty Fuel System of Great Britain has hitherto attempted to achieve automatic flow control by providing for controlled inlet cavitation through regulated inlet restriction in response to variations in control pressure. Such cavitation is objectionable in that it reduces efficiency and has a destructive effect on impeller vanes.

For current and future, engine applications requiring high fuel flow rated (supersonic engines with after-burner configuration) the centrifugal pump has the highest development potential, but when the pump speed is in fixed ratio with engine speed, the temperature rise in the fuel at extreme turn-down condition (high altitude, low cruise speed) becomes prohibitive and it is impractical to use a single stage full running centrifugal pump, for "turn-down" ratio over 15:1. Today new engine designs are approaching turn-down ratios of 100:1.

Other approaches to a solution of the problems mentioned above have been: (1) Multi-Stage Centrifugal Pumps; (2) Variable Speed Drive; (3) Separate pumps with change-over valves. Many of the complications and disadvantages of these approaches, when compared to the solution offered by the present invention, are obvious. An infinite number of stages would be needed to equal the performance of a pump having an automatically adjustable pumping capacity.

SUMMARY OF INVENTION

The present invention provides a centrifugal pump with a variable-geometry impeller wherein flow regulation is effected by varying the impeller configuration so as to match engine demand. Since the impeller geometry is adjusted at all flows for optimum efficiency, the temperature rise of the fuel is kept to a minimum over the whole working range of a gas-turbine fuel system. My invention meets the above stated problems by providing for automatic variation of the ratio of pump delivery to engine speed through variation of the effective width of the impeller, thus varying the cross-sectional area of its pumping passages. My variable geometry centrifugal pump is a single stage pump with a fully shrouded type impeller. The impeller vanes fit snugly but freely movable in slots machined in the shroud, allowing in this manner axial movement of the shroud, action that varies the impeller vane width-to-diameter ratio and changes the optimum flow design point. The shroud is actuated by a servo piston so that the axial displacement produced, in conjunction with the designed leading-edge shapes, gives a characteristic for piston travel-flow area relationship such as to ensure closed loop system stability with downstream governing or flow regulating devices.

OBJECTS OF INVENTION

A general object is to improve centrifugal pump efficiency at partial flow conditions. Related objects are to minimize fluid temperature rise; to cause the pump impeller to always operate at its best efficiency; to prevent cavitation-induced efficiency losses and impeller damage; to obtain substantially constant operating efficiency under partial load operating conditions; and to minimize recirculation losses and heat generation.

FIG. 1 is an axial sectional view of a pump embodying the invention, the impeller section being taken on line 1—1 of FIG. 3, the shroud and servo parts being shown in different positions of adjustment above and below the major axis of the pump, and control parts being shown in schematic diagram;

FIG. 1A is a fragmentary sectional view of a modified form of the impeller inlet;

FIG. 2 is an exploded axial sectional view of the impeller and shroud elements thereof;

FIG. 3 is an end view of the shroud, two of the associated impeller vanes being shown in section, as indicated by the line 3—3 of FIG. 1;

FIG. 4 is a comparative performance of the invention and of a conventional centrifugal pump;

FIG. 5 is a fragmentary sectional view of a modified form of the servo-actuator; and FIG. 6 is a fragmentary sectional view of another modified form thereof.

DESCRIPTION

Referring now to FIGS. 1, 2 and 3, I have shown therein, as an example of one form in which the invention may be embodied, a pump embodying, in general, a volute manifold A providing a pump chamber in which an assembly of impeller B and axially adjustable shroud C is mounted for rotation; a shaft housing D closing the inner end of the pump chamber, and in which is mounted a drive shaft and bearing assembly E; a servoactuator assembly F, operable in response to fluctuations in a control pressure, related to pump discharge pressure, to adjust the shroud C axially with relation to impeller B; and an end cover G.

Manifold A provides an inlet 10 on the pump axis, a counterbore 11 to receive the hub of shroud C, a larger counterbore 12 defining the major volume of a pump chamber 13, a volute cavity 14, encircling the periphery of the impeller-shroud assembly, to collect the discharge therefrom, a discharge outlet 15 extending tangentially from the cavity 14 at its area of maximum radial depth, in accordance with conventional centrifugal pump volute design; and an outer counterbore 16 to receive one end of shaft housing D.

Shaft housing D comprises a head portion 20 having a cylindrical periphery fitted in counterbore 16 and a peripheral groove in which an O-ring gasket 21 seals it to the counterbore 16; a mounting flange 22 seated against the end of manifold A at the mouth of counterbore 16 and secured thereto by cap screws 23 extended through the flange and threaded into the manifold; and a body 24 in which is provided a bearing-mounting counterbore 25. Head portion 20 has a bore 26 communicating with counterbore 25 and with a shallow face counterbore 27 which is opposed to manifold counterbore 12 and cooperates therewith to define the pump chamber 13.

End cover G comprises a cylindrical plug portion 30 which is fitted in the outer end of counterbore 25 and has a peripheral groove seating an O-ring gasket 31 which seals it in the shaft housing D; and a flange 32 through which cap screws 33 are threaded into the end of housing body 24 to secure the cover thereto. A shaft seal 34 is mounted in a counterbore in the cover.

Shaft-bearing assembly E comprises a pair of ball bearings 40 mounted in counterbore 25 and spaced by a sleeve 41, a tubular impeller shaft 42 having a closed end 43 and an integral, reduced diameter stem 44 projecting therefrom through the seal 34, a seal ring assembly 45 interposed between the shaft end 43 and the seal 34 and sealing the shaft thereto, and an enlarged inner end portion 46 providing an annular shoulder against which the inner bearing 40 is abutted. Seal ring assembly 45 is secured in a counterbore in the shoulder of closed shaft end portion 43, by means of a screw 47.

Shaft 42 has a bore defining a servo actuator cylinder 48. Closed end 43 has a smaller central bore providing a spring-seating pocket 461.

Impeller B comprises a hub 50 inserted into the enlarged end portion 46 of tubular shaft 42 and secured thereto by screws 51, a radial disc 52 received in counterbore 27, and a plurality (e.g. 5) of vanes 53 of spiral form, projecting axially from the face of disc 52 and equally spaced about the circumference of the impeller. Impeller B is driven by rotary power applied to stem 44 and transmitted through shaft 42 to its hub 50. Pumping passages 54 of variable axial width are defined between impeller disc 52, vanes 53 and shroud C.

Shroud C comprises a shaft 50 which is slidably extended through impeller hub 50, an integral spider comprising several (e.g. 3) conically radiating arms 61; a hub 62 mounted on the spider, secured thereto by rivets 63, welding or other suitable means, and axially slidable in manifold counterbore 11; and a radially extending head 64 in the form of a thick cylindrical disc provided with a plurality of spiral slots 65 receiving and loosely mating with vanes 53 so that the shroud may shift axially relative to impeller B. The engagement of vanes 53 in slots 65 provides a rotary coupling connection between parts B and C such that shroud C is carried by and rotates in unison with impeller B while freely shiftable axailly so as to vary the axial width of pumping passages 54.

Automatic adjustment of the width of passages 54 is effected by servo-actuator assembly F, comprising a servo piston 70 secured, as by screws 71, to the end of shroud shaft 60 and slidable in servo cylinder 48 in response to pump discharge pressure applied to a servo chamber 72 (defined between piston 70 and impeller hub 50) through a fitting 73 mounted in housing D, the fitting communicating, through a bore 74, with an annular chamber 75 adjacent the inner bearing 40, and, through a plurality of ports 76 in impeller shaft 41, with the servo chamber 72.

The fitting 73 may transmit pressure to servo chamber 72 through a feedback line 80 from a control area CA such as a control box in a line leading from the pump to a system component that is supplied with fluid by the pump, or from another control area in which there is present a reference pressure, suitably representative of varying pressure conditions which may have to be dealt with by the pump. Alternatively, the annular chamber 75 may be subjected directly to the pump's discharge pressure, through a suitable connection from the discharge outlet 15 to the fitting 73 or directly to annular chamber 75.

At the opposite end of piston 70 from actuator chamber 72, a coil spring 77 loads the piston for movement of impeller shroud C to open position (maximum volume of pumping passages 54) when not subjected to fluid pressure in chamber 72. Movement of the shroud back to a position restricting the area of pumping passage 54 will then occur when operation of the pump is started, and the extent of such movement will depend upon the pressure differential across the piston 70, the pump inlet pressure being transmitted through an axial passage 78 in shroud shaft 60 to the chamber 79 defined between piston 70 and the closed end 43 of impeller shaft 42. Spring 77 is contained in chamber 79, its ends being received and positioned respectively in the pocket 48 of shaft end 43, and in a counterbore in the opposed end of piston 70.

OPERATION

Reference is made to FIG. 4, comparatively showing performance curves of the invention and of a standard fixed-geometry centrifugal pump. Pressure values are plotted on the Y axis, indicated at P, and flow (percent of rated flow) is plotted along the X axis indicated at F. The solid line curve PR at the top indicates percent of rated pressure rise (variation) for both the conventional fixed geometry pump and the variable geometry pump of the invention. The broken line curve E–FG designates percent of maximum efficiency of a conventional fixed geometry pump. The broken line curve E–VG designates percent of maximum efficiency of the variable geometry pump of the invention. The broken line BHP–FG, designates percent of rated brake horsepower input for a conventional pump; and the broken line BHP–VG indicates percent of rated brake horsepower for the invention. Curve PR shows that pressure rise is at a maximum at start-up of pump operation with zero flow, and that it drops off to a somewhat lower value at maximum flow. Both pressure and flow are indicated at a magnitude of 100 at a point where flow and pressure are at optimum operating efficiency, the actual values of presure and flow being selected to meet requirements for a particular job design. The curves for percentage of maximum efficiency and of rated brake horsepower intersect at this point to indicate the optimum efficiency at a selected maximum of operating range. The difference between pressures at zero flow and maximum flow, indicated at DP, is available as a pressure differential which can be applied either directly, or as a derivative differential developed in the control area CA of FIG. 1 and transmitted through feed-back line 80, to the servo chamber 72. Under partial load conditions, the pressure differential is available for adjusting the impeller geometry, the differential becoming higher as the flow becomes less, and vice versa. Accordingly, as flow decreases, the increasing differential, applied in srvo chamber 72, will move the servo piston 70 against the compression of spring 77 so as to draw the shroud closer to the impeller disc 52, thus restricting the area of flow passages 54 of the impeller, maintaining inlet pressure sufficiently high to avoid cavitation, and correspondingly maintaining pump efficiency at a high level until flow is reduced nearly to zero. Conversely, the operating efficiency rises rapidly after start-up, approaching 80% at 5% of maximum flow, and reaching nearly 95% efficiency at about 30% of maximum flow, as indicated by curve E–VG. In contrast to this, the efficiency of a conventional fixed-geometry pump rises on a nearly uniform ratio, reaching only 40% efficiency at 30% flow, and reaching 95% efficiency only when flow has risen to about 75% (curve E–FG). Percentage of rated brake horsepower input required for operating the conventional pump is 80% immediately at startup, and increases on a nearly uniform rise from 80% to 100% throughout the range of flow increase, whereas the percentage of rated horsepower input for operating the pump of this invention is only 20% at startup and increases slowly to only about 45% at 50% of maximum flow, with a gradually accelerating increase to 85% at 90% of maximum flow.

MODIFIED FORMS

FIG. 5 illustrates a possible modification of the actuator (designated F1 in its modified form) in which shroud shaft 160 is solid, and in which pressure in chamber 79 may be maintained at atmospheric level, e.g. by means of a duct 161 in drive stem 144. Other features of this construction may be the same as in FIGS. 1–4, and pressure differential DP may be applied to servo chamber 72 in the same manner.

FIG. 6 illustrates another possible modification of the actuator, designated F2, in which servo piston 70 may be loaded by a spring 277 tending normally to close the impeller shroud toward flow-restricting position, and in which a pressure differential derived in inverse relation to the differential developed at pump discharge or in control area CA, is applied to the back of piston 70 in chamber 279, so as to move piston 70 in shroud-opening direction in direct relation to flow. Thus, with the pump discharge differential DP at a maximum at zero flow, the derived differential IDP, inversely related to the differential DP, utilized as a control signal for the servo actuator unit F2, will be at a minimum at zero flow, thus allowing the impeller to be closed down by spring 277 to minimum flow area of its pumping passages 54, and as flow increases, the control signal will correspondingly increase so as to move the shroud to greater impelled width, thus increasing the area of pumping passages 54.

I claim:

1. In a centrifugal pump with pressure differential responsive flow control, in combination:
    an impeller element comprising a rotatable body and a plurality of vanes projecting axially therefrom;
    a shroud element comprising a circular body having axially extending slots slidably receiving said vanes for relative axial movements between said elements, pumping passages being defined between said elements and said vanes and being variable in width in accordance with variations in axial spacing between said elements;
    one of said elements having an impeller inlet and one of said elements having drive receiving means through which said elements may be rotated in unison;
    housing means having an inlet communicating with said impeller inlet and an outlet to deliver the discharge from said impeller;
    and an actuator having an axially movable part responsive to a pressure signal derived from the pressure of said discharge, and having a connection from said axially movable part to one of said elements for effecting said relative axial movements between said elements so as to adjust the width of said pumping passages in accordance with load demand upon the pump;
    said impeller inlet being a part of said shroud;
    said drive-receiving means comprising a tubular drive shaft attached to said impeller body; and
    said connection comprising a shroud shaft slidable in said drive shaft and attached to said shroud;
    an actuator cylinder being defined within said drive shaft; and
    said movable actuator part being a piston attached to an end of said shroud shaft remote from said shroud and slidable in said cylinder an rotatable within said reduced bore;
    and said shroud shaft being tubular, providing communication between said shroud inlet and said cylinder on the side of said piston remote from said shroud; and
    means providing a fluid connection through said drive shaft to said cylinder between the impeller and said piston, for application of said pressure signal to said piston in a direction to close said shroud toward said impeller in response to increase in said pressure differential of said signal.

2. In a centrifugal pump with pressure differential responsive flow control, in combination:
    an impeller element comprising a rotatable body and a plurality of vanes projecting axially therefrom;
    a shroud element comprising a circular body having axially extending slots slidably receiving said vanes for relative axial movements between said elements, pumping passages being defined between said elements and said vanes and being variable in width in accordance with variations in axial spacing between said elements;
    one of said elements having an impeller inlet and one of said elements having drive receiving means through which said elements may be rotated in unison;
    housing means having an inlet communicating with said impeller inlet and an outlet to deliver the discharge from said impeller;
    and an actuator having an axially movable part responsive to a pressure signal derived from the pressure of said discharge, and having a connection from said axially movable part to one of said elements for effecting said relative axial movements between said elements so as to adjust the width of said pumping passages in accordance with load demand upon the pump;
    said housing means having its said inlet at one end thereof and providing a pump chamber adjacent its said inlet and communicating therewith, and providing a bearing chamber adjacent its other end, said chambers being connected by a reduced bore;
    said drive-receiving means comprising a tubular drive shaft disposed in said bearing chamber;
    bearings mounted in said bearing chamber and mounting said shaft for rotation;
    said actuator including a piston slidable in said tubular shaft and rotatable within said reduced bore;
    said impeller having a hub mounted in the end of said shaft;
    said connection comprising a shroud shaft slidably extended through said hub, attached at one end to said shroud and at its other end to said piston;
    a servo chamber being defined between said hub and said piston within said shaft, in which said signal is applied so as to shift said shroud toward said impeller in response to increase in the pressure value of said signal.

3. A pump as defined in claim 1:
    said tubular drive shaft having a radial port communicating said servo chamber with said bearing chamber;
    and said housing means having a signal transmitting passage communicating with said port through said bearing chamber;
    and a coil spring disposed within said tubular drive shaft and compressively engaging said piston on the opposite side thereof from said servo chamber, and spring-loading said shroud away from said impeller.

References Cited

UNITED STATES PATENTS

| 2,957,424 | 10/1960 | Brundage et al. | 103—97 |
| 3,150,650 | 9/1964 | Dreesen et al. | |
| 3,407,740 | 10/1968 | Samerdyke | 103—97 |

FOREIGN PATENTS

| 497,139 | 11/1950 | Belgium. |

LEONARD H. GERIN, Primary Examiner

U.S. Cl. X.R.

230—114